(12) United States Patent
Crumley et al.

(10) Patent No.: US 11,330,229 B1
(45) Date of Patent: May 10, 2022

(54) APPARATUSES, COMPUTER-IMPLEMENTED METHODS, AND COMPUTER PROGRAM PRODUCTS FOR GENERATING A COLLABORATIVE CONTEXTUAL SUMMARY INTERFACE IN ASSOCIATION WITH AN AUDIO-VIDEO CONFERENCING INTERFACE SERVICE

(71) Applicants: ATLASSIAN PTY LTD., Sydney (AU); ATLASSIAN, INC., San Francisco, CA (US)

(72) Inventors: Ryan Crumley, Austin, TX (US); Matthew McDaniel, Austin, TX (US); Shiuan-chin Chang, Sunnyvale, CA (US); Dylan Soechting, Austin, TX (US)

(73) Assignees: ATLASSIAN PTY LTD., Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/487,387

(22) Filed: Sep. 28, 2021

(51) Int. Cl.
| | |
|---|---|
| H04N 7/14 | (2006.01) |
| H04N 7/15 | (2006.01) |
| H04L 12/18 | (2006.01) |
| H04N 21/2187 | (2011.01) |
| H04L 65/403 | (2022.01) |
| H04N 21/4788 | (2011.01) |

(Continued)

(52) U.S. Cl.
CPC .......... *H04N 7/15* (2013.01); *H04L 12/1827* (2013.01); *H04L 12/1831* (2013.01); *H04L 65/1083* (2013.01); *H04L 65/403* (2013.01); *H04N 21/2187* (2013.01); *H04N 21/4788* (2013.01); *H04N 21/47217* (2013.01)

(58) Field of Classification Search
CPC .. H04N 7/15; H04N 21/2187; H04N 21/4788; H04N 21/47217; H04L 12/1827; H04L 12/1831; H04L 65/1083; H04L 65/403
USPC ...................................... 348/14.08
See application file for complete search history.

(56) References Cited

U.S. PATENT DOCUMENTS

| | | | | |
|---|---|---|---|---|
| 7,714,878 B2 * | 5/2010 | Gabay | ................... | H04L 65/604 |
| | | | | 345/626 |
| 8,311,950 B1 * | 11/2012 | Kunal | ................ | G06Q 30/0201 |
| | | | | 705/319 |

(Continued)

*Primary Examiner* — Khai N. Nguyen
(74) *Attorney, Agent, or Firm* — Alston & Bird LLP

(57) ABSTRACT

Various embodiments of the present disclosure provide for generation of a collaborative contextual summary interface in association with an audio-video conferencing interface service. An example embodiment is configured to monitor an active audio-video conference presentation that is configured for display to participating client devices by the audio-video conferencing interface service, identify a first capture content request associated with the active audio-video conference presentation, generate a first captured content data object based at least in part on the first capture content request, correlate a first captured content interface indicator to the first captured content data object, and generate a collaborative contextual summary interface based at least in part on the first captured content data object, wherein the collaborative contextual summary interface comprises the first captured content interface indicator.

22 Claims, 8 Drawing Sheets

(51) Int. Cl.
*H04N 21/472* (2011.01)
*H04L 65/1083* (2022.01)

(56) References Cited

U.S. PATENT DOCUMENTS

| | | | | |
|---|---|---|---|---|
| 9,454,789 | B2* | 9/2016 | Lord | H04N 21/42203 |
| 9,648,275 | B2* | 5/2017 | Tamura | H04M 3/567 |
| 10,404,943 | B1* | 9/2019 | Fieldman | H04L 65/1069 |
| 10,708,673 | B2* | 7/2020 | Bi | G06F 16/743 |
| 10,979,481 | B2* | 4/2021 | Jayaweera | H04W 4/24 |
| 11,023,690 | B2* | 6/2021 | Yoshioka | G10L 13/08 |
| 11,030,813 | B2* | 6/2021 | Hare | G06T 7/70 |
| 2009/0171973 | A1* | 7/2009 | Gagne | G06F 16/48 |
| 2015/0016661 | A1* | 1/2015 | Lord | H04N 21/2668 |
| | | | | 382/100 |
| 2016/0117624 | A1* | 4/2016 | Flores | H04L 67/306 |
| | | | | 705/7.39 |
| 2016/0165056 | A1* | 6/2016 | Bargetzi | H04L 12/1822 |
| | | | | 455/416 |
| 2016/0205349 | A1* | 7/2016 | Cheng | H04N 5/06 |
| | | | | 348/14.08 |
| 2016/0338120 | A1* | 11/2016 | Boyle | G06T 3/4092 |
| 2017/0006162 | A1* | 1/2017 | Bargetzi | H04W 4/06 |
| 2020/0349230 | A1* | 11/2020 | Yoshioka | G10L 15/26 |
| 2021/0044645 | A1* | 2/2021 | Jayaweera | H04L 65/601 |
| 2021/0367801 | A1* | 11/2021 | Rajamani | H04N 7/15 |

* cited by examiner

APPARATUSES, COMPUTER-IMPLEMENTED METHODS, AND COMPUTER PROGRAM PRODUCTS FOR GENERATING A COLLABORATIVE CONTEXTUAL SUMMARY INTERFACE IN ASSOCIATION WITH AN AUDIO-VIDEO CONFERENCING INTERFACE SERVICE

BACKGROUND

Applicant has identified a number of deficiencies and problems associated with efficiently identifying and effectively disseminating pertinent information (e.g., decisions, action items, moments, etc.) among a plurality of users in existing systems that provide multi-party virtual meeting environments (e.g., audio/video conferencing). Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include improved apparatuses, methods, systems, and computer program products configured for generating and maintaining a collaborative contextual summary interface in association with an active audio-video conference presentation provided by an audio-video conferencing interface service. In accordance with one exemplary embodiment of the present disclosure, an apparatus is configured to generate a collaborative contextual summary interface in association with an audio-video conferencing interface service, the apparatus comprising at least one processor and at least one memory, the at least one memory having computer-coded instructions therein, wherein the computer-coded instructions are configured to, in execution with the at least one processor, cause the apparatus to monitor an active audio-video conference presentation that is configured for display to participating client devices by the audio-video conferencing interface service, wherein the active audio-video conference presentation is assigned a presentation identifier; identify a first capture content request associated with the active audio-video conference presentation, wherein the first capture content request comprises a first user identifier associated with one of the participating client devices, a first capture type identifier, and an initial timestamp value associated with first capture content request; generate a first captured content data object based at least in part on the first capture content request, wherein the first captured content data object is assigned a first captured content identifier; correlate a first captured content interface indicator to the first captured content data object, wherein the first captured content interface indicator corresponds to the capture type identifier; and generate a collaborative contextual summary interface based at least in part on the first captured content data object, wherein the collaborative contextual summary interface comprises the first captured content interface indicator, and wherein the collaborative contextual summary interface is configured for rendering to at least the one of the participating client devices associated with the first user identifier.

In some embodiments, the active audio-video conference presentation is a live streaming presentation displayed in real time by the audio-video conferencing interface service to each of the participating client devices. In still further embodiments, the active audio-video conference presentation is a stored playback presentation displayed to at least the one of the participating devices associated with the first user identifier.

In some embodiments, the first captured content interface indicator is selected from a plurality of captured content interface indicators, each captured content interface indicator associated with a different capture type identifier. In certain embodiments, the capture type identifier is selected from one of capture note type identifier, assign action type identifier, capture decision type identifier, record moment type identifier, external service push type identifier, capture screenshot type identifier, object state change type identifier, capture question type identifier, capture answer type identifier, capture object link type identifier, or capture sprint start type identifier.

In some embodiments, the collaborative contextual summary interface comprises a visual playback representation element, the visual playback representation element representing a time duration of the active audio-video conference presentation. In still further embodiments, the computer-coded instructions are further configured to, in execution with the at least one processor, cause the apparatus to determine a position of the first captured content interface indicator relative to the visual playback representation element, wherein the determined position is based at least in part on the initial timestamp value relative to the time duration of active-video conference presentation; and cause rendering of the collaborative contextual summary interface to at least the one of the participating client devices associated with the first user identifier, wherein the first captured content interface indicator is displayed to the collaborative contextual summary interface in the determined position relative to the visual playback representation element. In still further embodiments, upon detection of user engagement with the first captured content interface indicator, the computer-coded instructions are further configured to, in execution with the at least one processor, cause the apparatus to update the collaborative contextual summary interface to display a stored playback presentation of at least a portion of the active audio-video conference presentation, wherein the stored playback presentation commences with rendering of media content of the active audio-video conference presentation corresponding to the initial timestamp value associated with the first captured content interface indicator.

In some embodiments, the collaborative contextual summary interface further comprises a transcription interface, the transcription interface comprising textual transcription data substantially synchronized with the active audio-video conference presentation. In still further embodiments, the transcription interface comprises one or more annotation bubble objects associated with the textual transcription data and wherein one of the one or more annotation bubble objects comprises the first captured content interface indicator. In certain embodiments, upon detection of user engagement with the first captured content interface indicator, the computer-coded instructions are further configured to, in execution with the at least one processor, cause the apparatus to update the collaborative contextual summary interface to display a stored playback presentation of at least a portion of the active audio-video conference presentation, wherein the stored playback presentation commences with rendering of media content of the active audio-video conference presentation corresponding to the initial timestamp value associated with the first captured content interface indicator. In still further embodiments, the first capture content request further comprises a concluding timestamp value and the stored playback presentation concludes with rendering of media content of the active audio-video conference presentation corresponding to the concluding timestamp value. In certain embodiments, the capture type identifier is a record moment type identifier.

In some embodiments, the computer-coded instructions are further configured to, in execution with the at least one processor, cause the apparatus to store the collaborative contextual summary interface in a collaboration repository in association with the presentation identifier. In certain embodiments, the collaborative contextual summary interface further comprises a share summary interface element. In further embodiments, upon detection of user engagement with the share summary interface element, the computer-coded instructions are configured to, in execution with the at least one processor, cause the apparatus to generate a collaborative contextual summary interface object that is configured to cause a client device to render the collaborative contextual summary interface. In still further embodiments, the computer-coded instructions are configured to, in execution with the at least one processor, cause the apparatus to output the collaborative contextual summary interface object to at least one of the participating client devices, wherein the at least one of the participating client devices is not associated with the first user identifier; and upon detection of user engagement with the collaborative contextual summary interface object, cause rendering of the collaborative contextual summary interface to the at least one of the participating client devices. In other embodiments, the computer-coded instructions are configured to, in execution with the at least one processor, cause the apparatus to output the collaborative contextual summary interface object to at least one non-participating client device; and upon detection of user engagement with the collaborative contextual summary interface object, cause rendering of the collaborative contextual summary interface to the at least one non-participating client device.

In some embodiments, the computer-coded instructions are further configured to, in execution with the at least one processor, cause the apparatus to identify a second capture content request associated with the active audio-video conference presentation, wherein the second capture content request comprises the first user identifier, a second capture type identifier, the presentation identifier, and an initial timestamp value associated with second capture content request; generate a second captured content data object based at least in part on the second capture content request, wherein the second captured content data object is assigned a second captured content identifier; correlate a second captured content interface indicator to the second captured content data object, wherein the second captured content interface indicator corresponds to the second capture type identifier; and update the collaborative contextual summary interface based at least in part on the second captured content data object, wherein the collaborative contextual summary interface comprises the first captured content interface indicator and the second captured content interface indicator.

In some embodiments, the computer-coded instructions are further configured to, in execution with the at least one processor, cause the apparatus to identify a second capture content request associated with the active audio-video conference presentation, wherein the second capture content request comprises a second user identifier associated with one of the participating client devices, a second capture type identifier, and an initial timestamp value associated with second capture content request; generate a second captured content data object based at least in part on the second capture content request, wherein the second captured content data object is assigned a second captured content identifier; correlate a second captured content interface indicator to the second captured content data object, wherein the second captured content interface indicator corresponds to the second capture type identifier; and update the collaborative contextual summary interface based at least in part on the second captured content data object, wherein the collaborative contextual summary interface comprises the first captured content interface indicator and the second captured content interface indicator, and wherein the collaborative contextual summary interface is configured for rendering to at least the one of the participating client devices associated with the first user identifier and at least the one of the participating client devices associated with the second user identifier. In some further embodiments, the active audio-video conference presentation is a live streaming presentation displayed in real time by the audio-video conferencing interface service to each of the participating client devices, and wherein updating the collaborative contextual summary interface based at least in part on the second captured content data object comprises updating the collaborative contextual summary interface in real time. In still other embodiments, the active audio-video conference presentation is a stored playback presentation, and wherein updating the collaborative contextual summary interface based at least in part on the second captured content data object comprises updating the collaborative contextual summary interface in real time.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Figure 1:
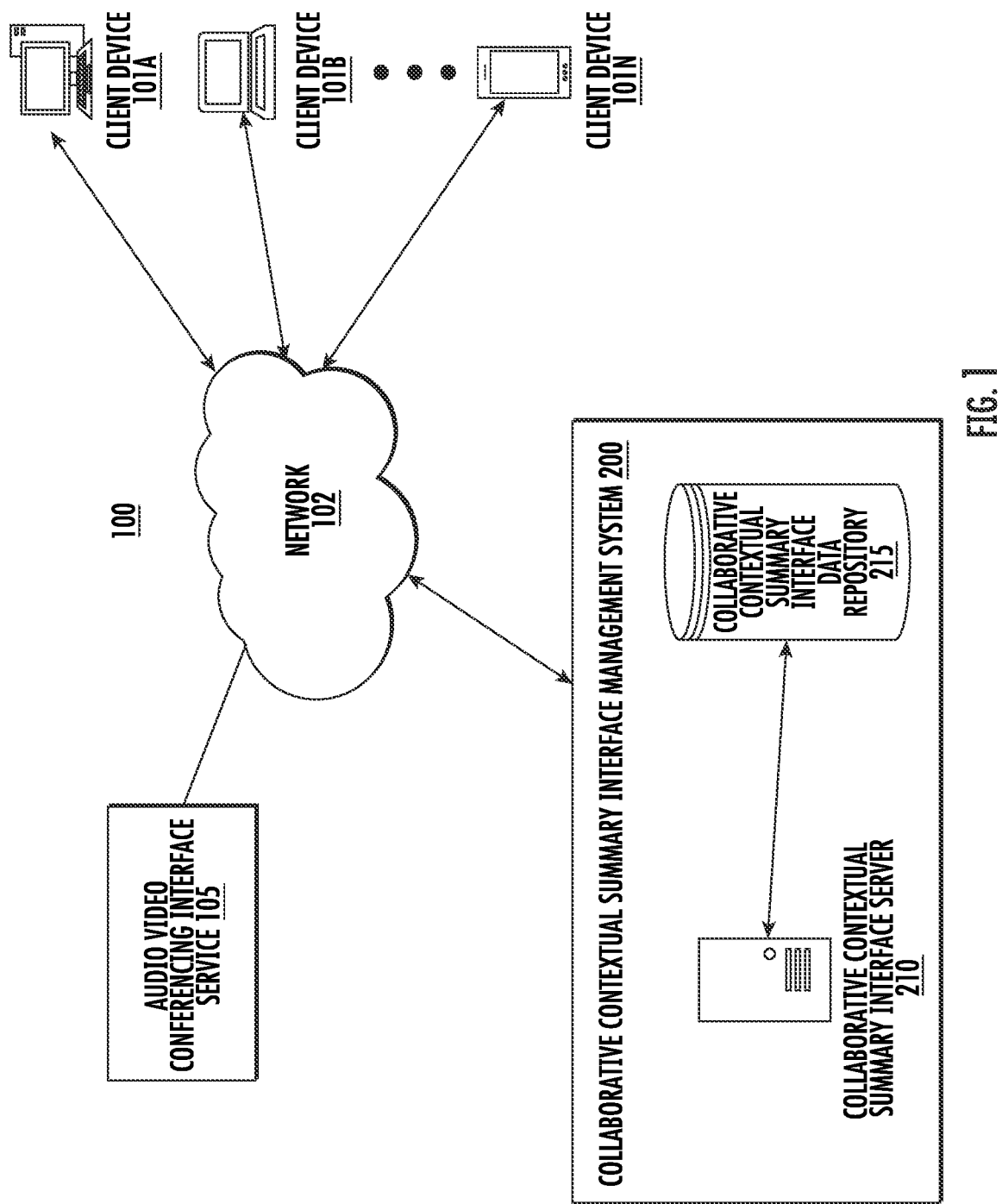
Figure 2:
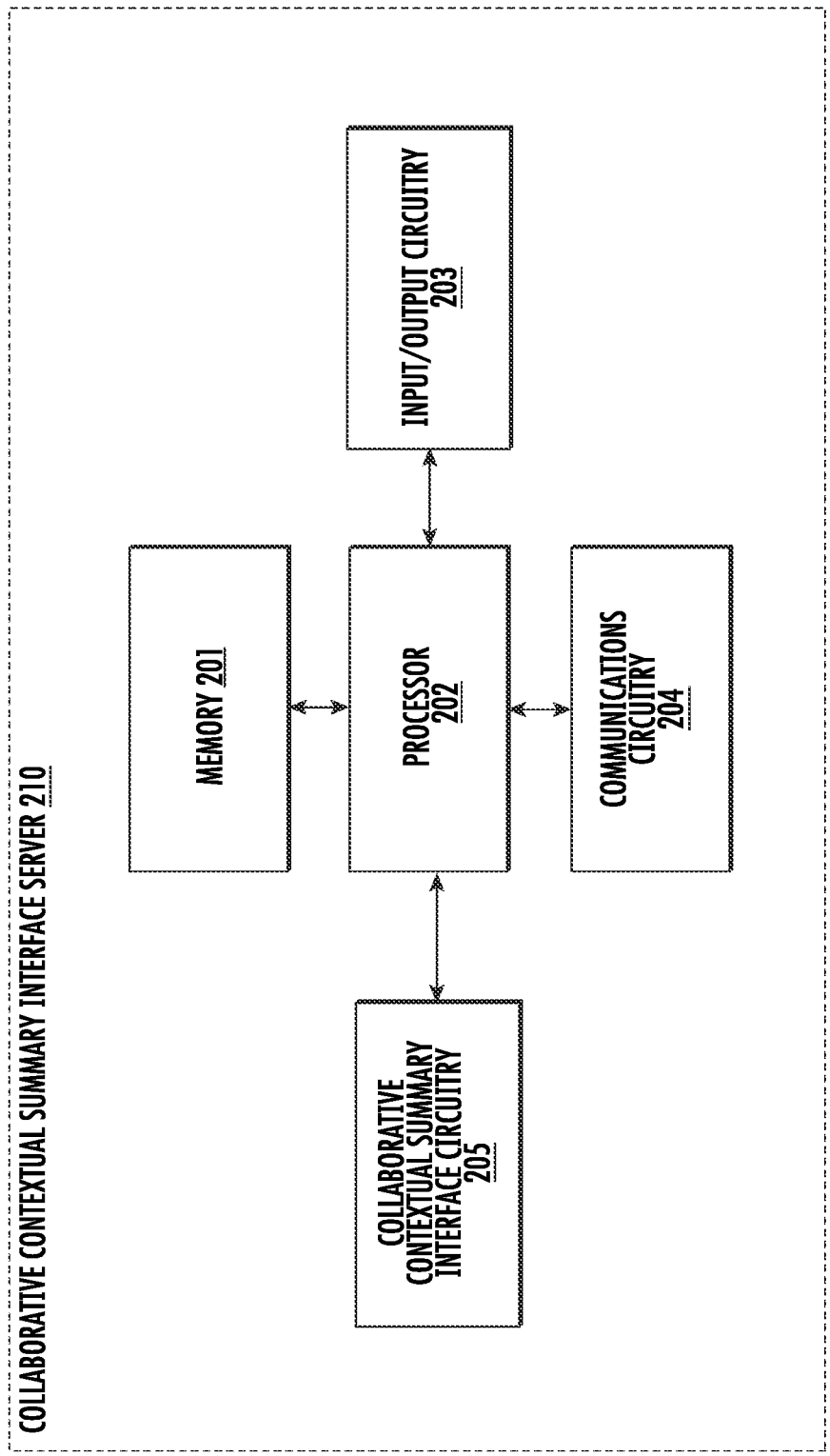
Figure 3:
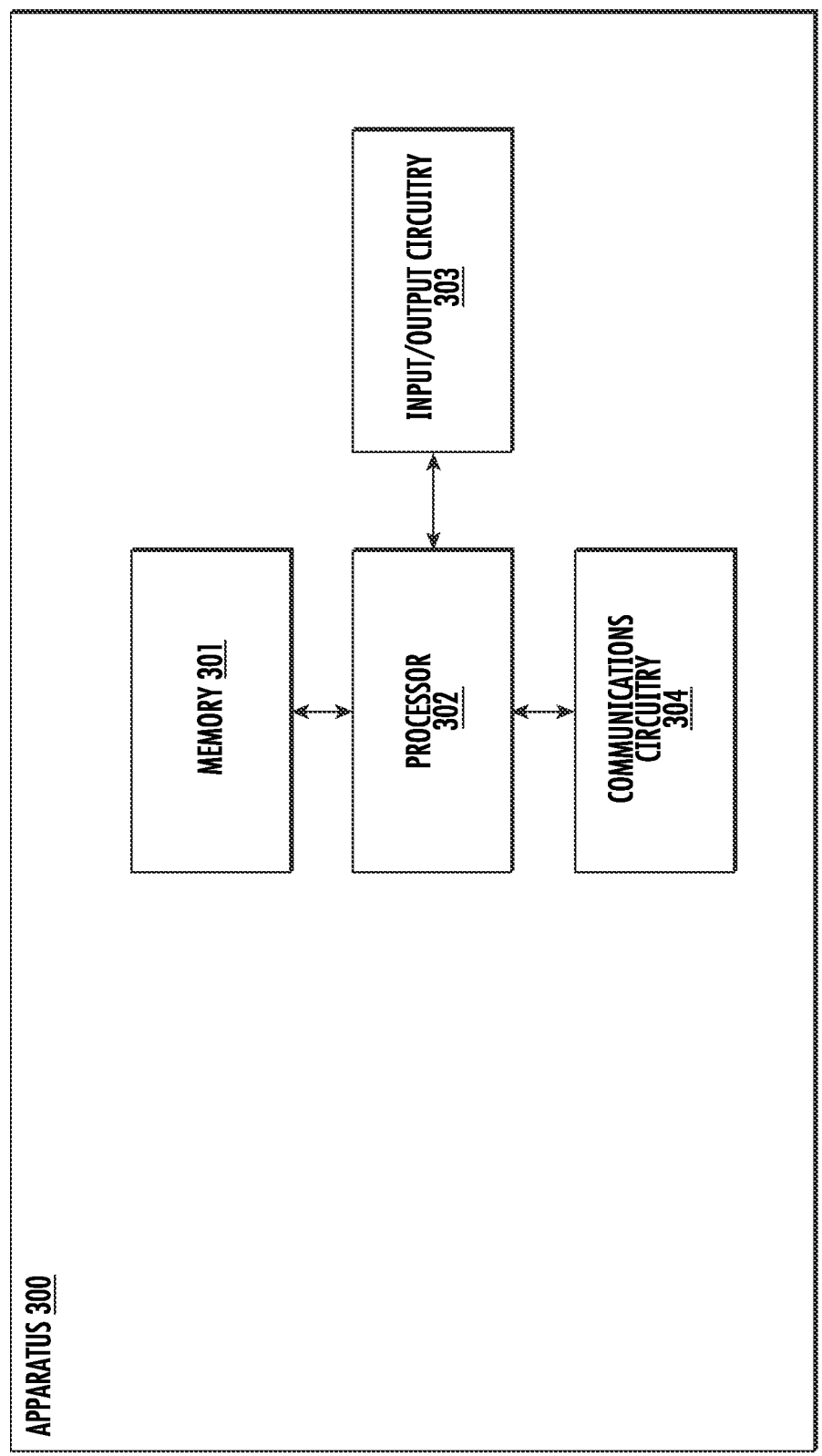
Figure 4:
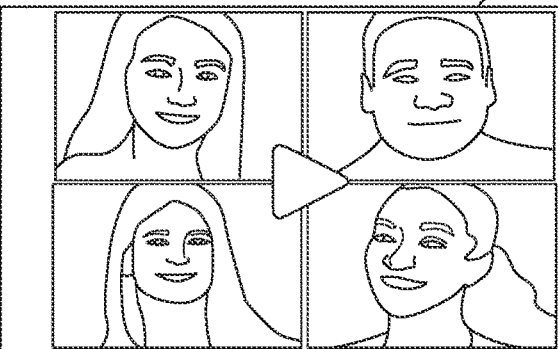
Figure 5A:
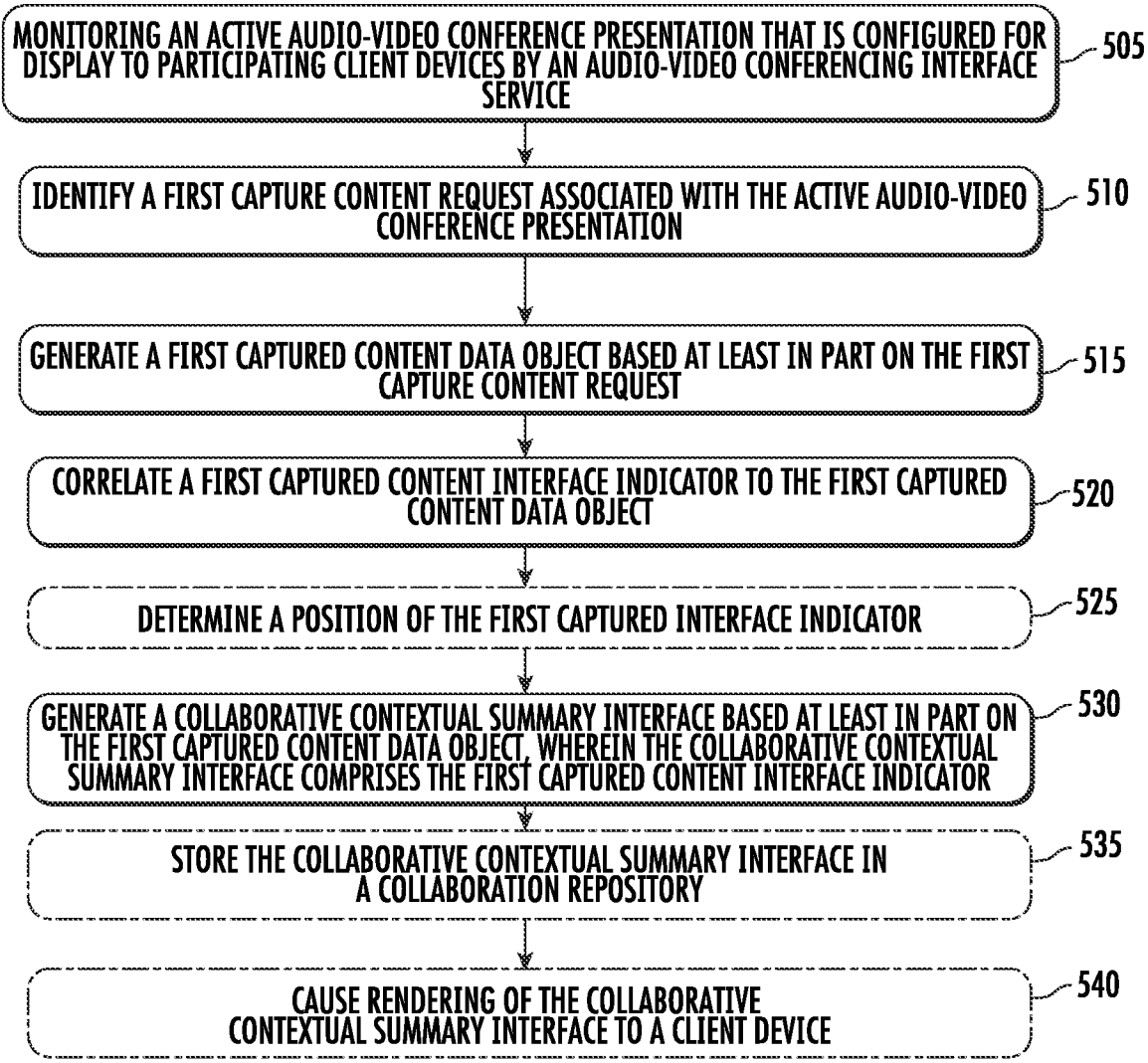
Figure 5B:
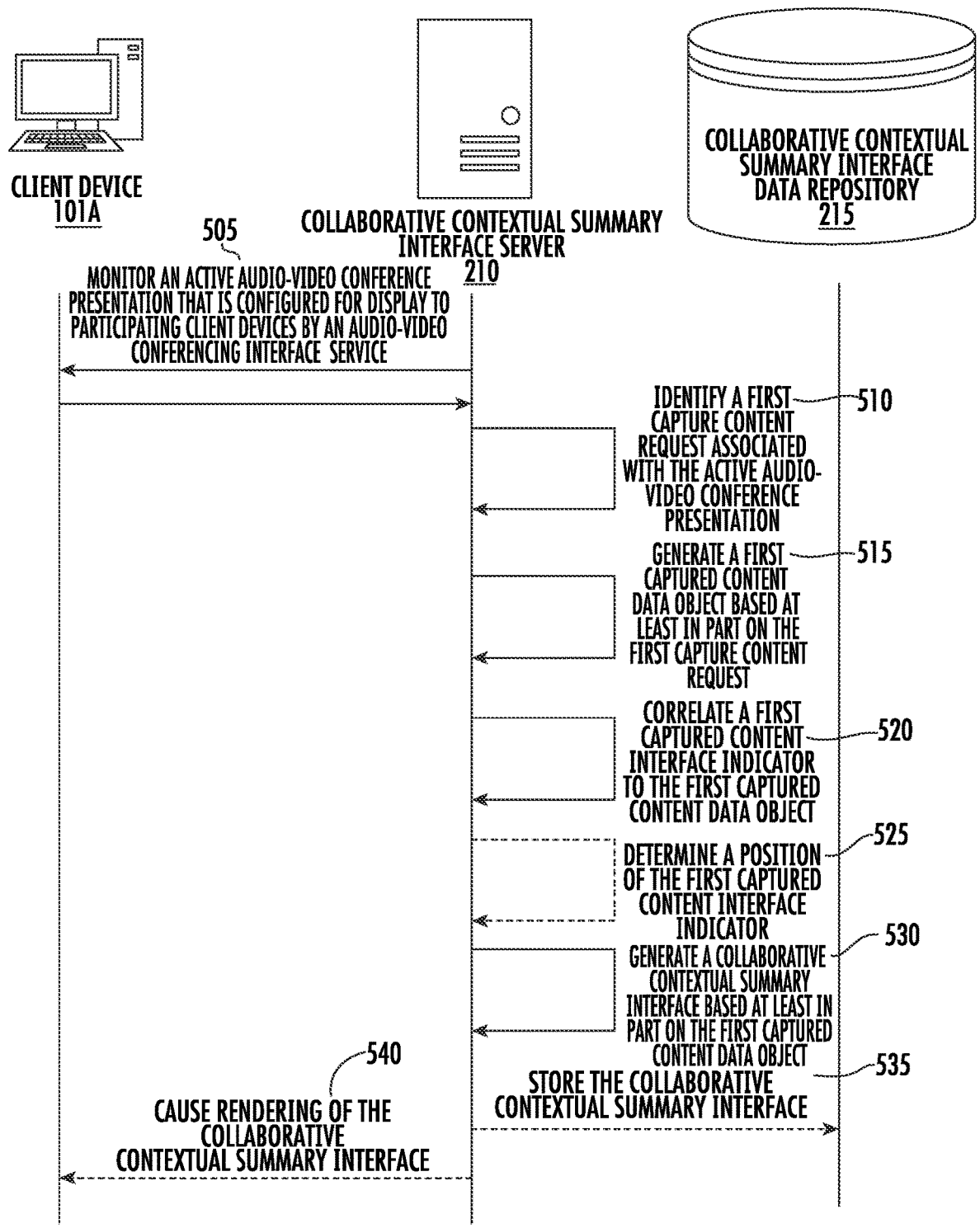
Figure 6:
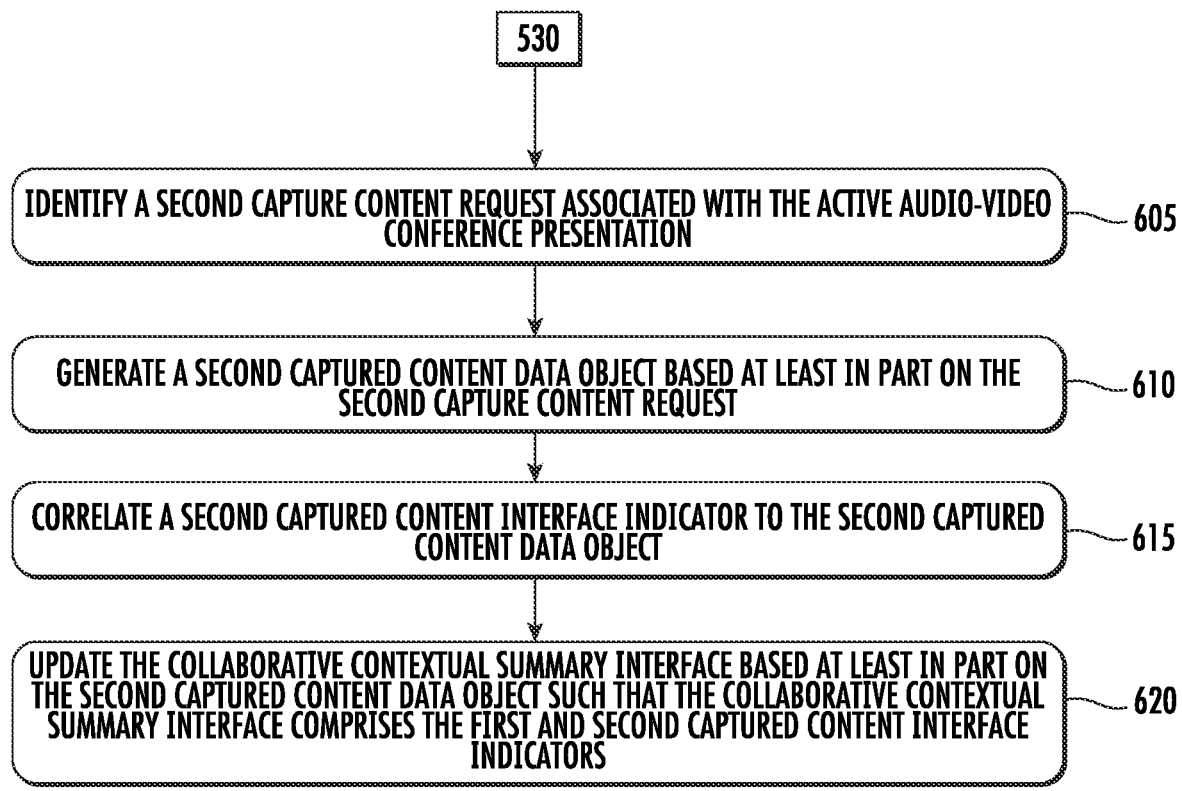
Figure 7:
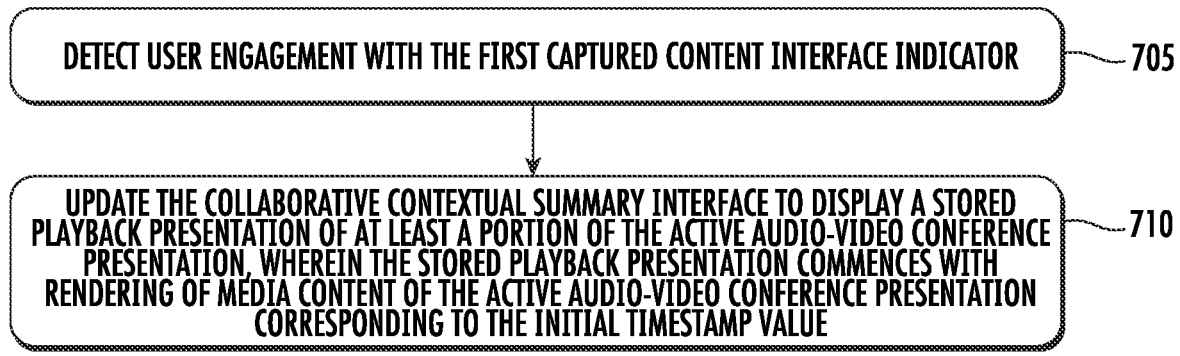

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example collaborative contextual summary interface management system configured to communicate with an audio-video conferencing interface service and two or more client devices in accordance with some example embodiments described herein;

FIG. 2 is a schematic block diagram of example circuitry for use in a collaborative contextual summary interface server in accordance with some example embodiments described herein;

FIG. 3 is a schematic block diagram of example circuitry for use in a client device in accordance with some example embodiments described herein;

FIG. 4 illustrates an example collaborative contextual summary interface structured in accordance with some example embodiments described herein;

FIG. 5A is a flowchart illustrating example operations for generating a collaborative contextual summary interface in accordance with various aspects and embodiments of the subject disclosure;

FIG. 5B is a signal diagram of an example data flow in accordance with various aspects and embodiments of the subject disclosure;

FIG. 6 is a flowchart illustrating example operations for updating a collaborative contextual summary interface in accordance with various aspects and embodiments of the subject disclosure; and FIG. 7 is a flowchart illustrating example operations for updating a collaborative contextual summary interface in accordance with various aspects and embodiments of the subject disclosure

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to an example "apparatus." However, elements of the apparatus described herein may be equally applicable to the claimed system, method, and computer program product. Accordingly, use of any such terms should not be taken to limit the spirit and scope of embodiments of the present disclosure.

Overview

Individuals and organizations routinely use audio-video conferencing services (e.g., Zoom®, GoToMeeting®, BlueJeans®, Webex®, Teams®, Google Meet®, or the like) to allow geographically-dispersed users to remotely communicate and collaborate within and across organizations using individual computing devices (e.g., laptops, desktops, smart phones, servers, and/or the like). A variety of information such as important decisions, action items, meeting moments, and/or the like may occur during such virtual meetings and participants may desire to capture, point to, highlight, or otherwise emphasize such moments of the virtual meeting to, for example, revisit later or to share with other team members.

The volume of pertinent information created during virtual meetings has continued to increase exponentially as more and more individuals use audio-video conferencing services to engage in virtual collaboration. It is undesirable to require participants to manually organize, circulate, and maintain meeting minutes in an attempt to retain or capture action items, meeting moments, insights, decisions, or the like. It is also undesirable to require users to review a recording of the meeting in its entirety or to painstakingly trim down a recording of the meeting to its relevant portions in an attempt to preserve context related to such outcomes. Accordingly, the inventors have determined it would be desirable and advantageous to create a collaborative contextual summary interface management system that is configured to programmatically identify or suggest, and effectively disseminate, pertinent content, such as key decisions, action items, assignments, important meeting moments, and other highlights from an audio-video conference presentation (e.g., Zoom® meeting) to a plurality of users in a contextually relevant manner.

Various embodiments of the present disclosure provide apparatuses, systems, computer-implemented methods, and computer program products for capturing content in a virtual meeting and generating, maintaining, and/or sharing a collaborative contextual summary interface to a plurality of users, including those users who participated in the live presentation of the meeting and/or those users who did not. Some such embodiments enhance meeting communication methods by reducing miscommunication, ensuring team alignment, increasing post-meeting accountability, and otherwise reducing time and cost expenditures incurred in culling and disseminating relevant information from the meeting.

Definitions

As used herein, the term "audio-video conferencing interface service" refers to an application, program, platform, and/or service configured for providing virtual video and/or audio conferencing (e.g., active audio-video conference presentation), webinars, live chats, streaming services, screen-sharing, and other real-time collaborative audio and/or video capabilities configured for display to a plurality of participating client devices. Non-limiting examples of an audio-video conferencing interface service include Zoom®, BlueJeans®, Webex®, Teams®, Google Meet®, and the like.

In some embodiments, an audio-video conferencing interface service is hosted by an "external resource" such that it is associated with a third-party controlled system and is configured for authenticated communication with a collaborative contextual summary interface management system to provide audio-video conferencing functionality to participating client devices. An external resource provides functionality not provided natively by the collaboration management system. The external resource operates on a compiled code base or repository that is separate and distinct from that which supports the collaborative contextual summary interface management system. In some embodiments, the external resource may communicate with the collaborative contextual summary interface management system, and vice versa, through one or more application program interfaces (APIs). In some embodiments, an audio-video conferencing interface service is hosted by the collaborative contextual summary interface management system.

The term "collaborative contextual summary interface management system" refers to a software platform and associated hardware that is configured to support, maintain, and manage collaborative contextual summary interface data associated with capturing, bookmarking, highlighting, or otherwise emphasizing selected content in an audio-video conferencing interface service. In some embodiments, the collaborative contextual summary interface management system, or a portion thereof, is at least partially configured to operate as a portion (e.g., plug-in, add-on, extension, etc.)

of an audio-video conferencing interface service. In some embodiments, the collaborative contextual summary interface management system, or a portion thereof, is configured to operate on compiled code bases or repositories that are separate and distinct (e.g., a standalone collaboration server or other computing device) from the audio-video conferencing interface service and/or one or more client devices associated with one or more users.

The term "collaborative contextual summary interface server" refers to a software platform and associated hardware that is configured to generate and/or manage collaborative contextual summary interface(s) in association with an audio-video conferencing interface service. The collaborative contextual summary interface server is accessible via one or more computing devices, is configured to monitor active audio-video conference presentation(s), identify and/or receive capture content requests, generate a collaborative contextual summary interface, and access one or more data repositories, such as a collaboration repository. The functionality of the collaborative contextual summary interface server may be provided via a single server or a collection of servers having a common functionality, or the functionality of the collaborative contextual summary interface server may be segmented among a plurality of servers or collections of servers performing subsets of the described functionality of the collaborative contextual summary interface server, such as in a cloud networking environment.

A collaborative contextual summary interface server may update and/or maintain a shared dynamic collaborative contextual summary interface that provides for team collaborative work. For example, in some embodiments, the collaborative contextual summary interface server is configured to enable a plurality of users (e.g., participating and/or non-participating) to access, display, and/or modify/edit a dynamic collaborative contextual summary interface at the same time. Changes made by respective users to a shared dynamic collaborative contextual summary interface can be automatically stored/saved and synced between all users in real-time. For example, a first participating user may identify and assign an action associated with a selected portion of a live streaming presentation and other users may be able to view the updated dynamic collaborative contextual summary interface in real time, as well as capture additional content with respect to the live streaming presentation.

The term "collaborative contextual summary interface data repository" refers to a location, such as database stored on a memory device, which is accessible by one or more computing devices for retrieval and storage of data associated with collaborative contextual summary interface(s). For example, the collaborative contextual summary interface data repository includes one or more of collaborative contextual summary interface(s), presentation identifier(s), user identifier(s), capture type identifier(s), captured content identifier(s), and/or the like. The collaborative contextual summary interface data repository may be a dedicated device and/or a part of a larger repository. The collaborative contextual summary interface data repository may be dynamically updated or be static. In some embodiments, the collaborative contextual summary interface data repository is encrypted in order to limit unauthorized access of such collaborative contextual summary interface data.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure. In some embodiments, a client device is associated with a user. In some embodiments, an association is created by a client device transmitting authentication information associated with the user for the selected active audio-video conference presentation to the audio-video conferencing interface service and/or a collaborative contextual summary interface management system.

A "participating client device" of an active audio-video conference presentation refers to a client device associated with a user identifier identified as disposed, or having been disposed, in a real-time communicative relation with the live stream presentation of the active audio-video conference presentation. The term "non-participating client device" refers to a client device that may be configured for access to an active audio-video conference presentation, but which is not associated with a user identifier identified as disposed, or having been disposed, in a real-time communicative relation with the live stream presentation of the selected active audio-video conference presentation.

The term "capture content request" refers to an electrically generated digital object created by a computing device (e.g., participating client device) indicating that a user has provided an input comprising a request to capture content for highlighting, tagging, bookmarking, illustrating, and/or otherwise emphasizing some portion of the active audio-video presentation. In certain embodiments of the present disclosure, the selected content of the capture content request can be shared among and accessed by participating client devices and, in some instances, non-participating client devices, on a collaborative contextual summary interface.

A capture content request may be represented via a temporary code that is transmitted to a recipient (e.g., a collaborative contextual summary interface server) as an indication that a user has made the request. To provide further context, in one embodiment, a capture content request is generated in response to a user interaction or user engagement with a computing device (e.g., a participating client device or non-participating client device) wherein a user causes the computing device to generate a capture content request by interacting with, for example, a specific capture type actuator button or interface element rendered on a visual display of the computing device (e.g., a user clicking on a "Record a Moment" icon during an active audio-video conference presentation) indicating an intention to capture content. In some embodiments, the capture content request is associated with a variety of metadata such as one or more of a initiating user identifier, a presentation identifier, a capture type identifier, an initial timestamp value (e.g., associated with the selected portion of the active audio-video conference presentation), a concluding timestamp value, and/or other data for use in generating, updating, or otherwise supporting a collaborative contextual summary interface as described herein. The capture content request is configured to trigger the apparatus (e.g., a collaborative contextual summary interface server) to initiate a capture content process that may culminate in generation or updating of a collaborative contextual summary interface.

The term "collaborative contextual summary interface" refers to a user interface or sub-user interface comprising one or more captured content interface indicator(s) that is rendered to a visual display and is specially configured to enable a user to access, review, create, modify/edit, and/or identify captured content associated with an audio-video conference presentation that was monitored by a collaborative contextual summary interface management system (e.g., collaborative contextual summary interface server) during an active presentation of the audio-video conference presentation. In some embodiments, a collaborative contextual summary interface optionally comprises one or more of a visual playback representation element, a playback interface, a transcription interface comprising textual transcription data, one or more annotation bubble objects, a share summary interface element, and an export captured content interface element. Exemplary collaborative contextual summary interfaces may be rendered in any desired form including, but not limited to, as a mobile application for display on a mobile computing device (e.g., a smartphone, table computer, etc.), a webpage or website for display on a mobile or non-mobile computing device via the Internet, and the like. For example, the collaborative contextual summary interface 400 of FIG. 4 is an example of a collaborative contextual summary interface.

The term "captured content interface indicator" refers to a renderable indicator displayed to a collaborative contextual summary interface, the captured content interface indicator associated with the captured content identified by a capture content request. In some embodiments, a captured content interface indicator is selected from a plurality of captured content interface indicators, each captured content interface indicator associated with a different capture type (e.g., capture type identifier). That is, in some embodiments, captured content interface indicators are visually different based at least in part on selected capture type associated with the corresponding capture content request. In some embodiments, the captured content interface indicator is rendered to a position or location of the collaborative contextual summary interface such that it is indicative of the initial timestamp value relative to a visual playback representation element. For example, the captured content interface indicators 410 of FIG. 4 are examples of captured content interface indicators.

The term "captured content data object" refers to one or more electronically managed data representing the captured content associated with and/or identified by a captured content request. The captured content data object is a data representation of the captured content that is created by a computing device (e.g., collaborative contextual summary interface server) in response to identifying and/or receiving a captured content request. The captured content data object is correlated with a captured content interface indicator that is configured to be displayed to a collaborative contextual summary interface such that subsequent user engagement with or user selection of the captured content interface indicator initiates a process to view the correlated captured content represented by the captured content data object. In a non-limiting example context, a captured content data object refers to electronically managed data that represents the pertinent content of the active audio-video conference that was bookmarked by a user, such as a key decision or approval to develop a software product, an action item, a task assignment to fix a specified bug, or other important meeting moment that should be highlighted or pushed to one or more relevant users to get the work done. A captured content data object is assigned a captured content identifier by a computing device (e.g., collaborative contextual summary interface server) and can be stored in a data repository (e.g., collaborative contextual summary interface data repository) as the data representation of the corresponding captured content that was highlighted, tagged, bookmarked, illustrated, and/or otherwise emphasized in association with a capture content request.

As used herein, the term "presentation identifier" refers to one or more items of data by which an audio-video conference presentation may be identified within a collaborative contextual summary interface management system. For example, a presentation identifier may comprise text string(s), numerical character(s), alphabetical character(s), alphanumeric code(s), ASCII character(s), a pointer, an IP address, a MAC address, a memory address, other unique identifier, or a combination thereof.

The term "timestamp value" refers to a sequence of characters or encoded information identifying when a certain event occurs. In some embodiments, one or more timestamp values are captured, converted to, and/or stored in a primary time standard. For example, in some embodiments, one or more timestamp values are captured, converted to, and/or stored according to a Coordinated Universal Time (UTC) global standard. In some embodiments, one or more timestamp values are a relative timestamp value such that they identify when a certain event occurs in relation to another event or time (e.g., elapsed time relative to the start of a selected active audio-video conference presentation). In certain embodiments, such relative timestamp values are converted to and stored in the UTC global standard, thereby allowing calculations and comparisons to be performed regardless of source. For example, in some embodiments, timestamp values associated with the capture content request are substantially synchronized with the active audio-video conference presentation and/or the textual transcription data.

An "initial timestamp value" associated with a capture content request refers to a timestamp value identifying when the capture of media content begins. For example, in some embodiments, the capture of media content begins with a keystroke associated with a capture note type or user interaction with an indicator or icon associated with record moment type to record a moment. In some embodiments, a capture content request is associated with a selected capture type (e.g., record a moment) such that a "concluding timestamp value" is further identified. A "concluding timestamp value" refers to a timestamp value identifying when the capture of media content ends such that all interactions (e.g., keystrokes, video, etc.) are captured in the time interval between the initial timestamp value and the concluding timestamp value.

As used herein, the term "capture type" refers to a data parameter, attribute, or the like that defines the type of capture to be performed as associated with a captured content request. The collaborative contextual summary interface management system supports one or more capture types with respect to the selected active audio-video conference presentation. For example, a capture type (e.g., capture note type identifier, assign action type identifier, capture decision type identifier, record moment type identifier, external service push type identifier, capture screenshot type identifier, object state change type identifier, capture question type identifier, capture answer type identifier, capture object link type identifier, sprint start capture type identifier, and the like) for a corresponding capture content request may identify the corresponding capture content request as a request to record a moment, capture a note, assign an action, capture a decision, push content to an external service, capture a question, capture an answer, capture a screenshot, capture state change in an object (e.g., Jira® ticket being resolved), capture a link or card of an object being shared during the active audio-video conference presentation (e.g., capture link to the Confluence® page being shared during the presentation), capture a sprint start (e.g., identify tickets included in a sprint in association with a sprint planning meeting), and/or the like.

In certain embodiments, a user may be permitted to identify a capture type to be associated with a captured content request via user engagement with a client device to select a capture type from a renderable menu listing the available capture types, the menu rendered to a visual display of the client device. In some embodiments, the collaborative contextual summary interface server is configured to programmatically detect and/or determine a meeting type such that one or more different available capture types are displayed, For example, in a non-limiting example, a collaborative contextual summary interface server determines that the meeting type is a sprint planning meeting such that renderable menu listing further includes a capture sprint start capture type as an available capture type.

As used herein, the term "capture type identifier" refers to one or more items of data by which a capture type may be identified within a collaborative contextual summary interface management system. For example, a capture type identifier may comprise text string(s), numerical character(s), alphabetical character(s), alphanumeric code(s), ASCII character(s), a pointer, an IP address, a MAC address, a memory address, other unique identifier, or a combination thereof.

The term "visual playback representation element" refers to a renderable component configured to visually depict a time duration of an active audio-video conference presentation. A non-limiting example of a visual playback representation element is a video timeline or scroll bar. In certain embodiments, one or more captured content interface indicators are rendered to the visual playback representation element. For example, the visual playback representation element 420 of FIG. 4 is an example of a collaborative contextual summary interface.

The term "textual transcription data" refers to the data output resulting from one or more transcription operations performed with respect to one or more audio inputs of an audio visual conference presentation. In certain embodiments, as a non-limiting example, textual transcription data is generated via voice-to-text conversion of an audio component of the active audio-video conference presentation, such as automatic speech recognition (ASR). In a non-limiting example, transcription of the audio component of the active audio-video conference presentation is automatically executed in real-time so as to be substantially synchronized with a video component of the active audio-video conference presentation. In some embodiments, the textual transcription data is generated by and received from the audio-video conferencing interface service in association with the monitored active audio-video conferencing interface service. In some embodiments, the textual transcription data is generated by the collaborative contextual summary interface server in association with the monitored active audio-video conferencing interface service. In some embodiments, the textual transcription data is generated during a live streaming presentation (e.g., in real time) of an active audio-video conference presentation. In still further embodiments, the textual transcription data is generated from a stored playback presentation of an active audio-video conference presentation.

The term "transcription interface" refers to a user interface component, sub-user interface component, or modal that is rendered to a collaborative contextual summary interface and is specially configured to display a textual representation of the textual transcription data associated with a corresponding audio-video conference presentation. In some embodiments, a transcription interface is configured to enable a user to create, identify, review, and/or modify/edit captured content associated with a corresponding audio-video conference presentation. Exemplary transcription interfaces may be rendered in any desired form. For example, the transcription interface 440 of FIG. 4 is an example of a transcription interface.

The term "collaborative contextual summary interface object" refers to a data structure that includes data representing a collaborative contextual summary interface. For instance, the collaborative contextual summary interface object can be provided to a client device and a collaborative contextual summary interface can be configured based on the collaborative contextual summary interface object. The collaborative contextual summary interface object is a data structure representing the collaborative contextual summary interface that is created and/or modified by a computing device (e.g., collaborative contextual summary interface server) in response to identifying and/or receiving one or more captured content request(s). A collaborative contextual summary interface object can be stored in a data repository (e.g., collaborative contextual summary interface data repository) as the data representation of the corresponding collaborative contextual summary interface.

The terms "data," "content," "digital content," "digital content object," "signal", "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

As used herein, the term "user identifier" refers to one or more items of data by which a user may be identified within a collaboration management system. For example, a user identifier may comprise text string(s), numerical character(s), alphabetical character(s), alphanumeric code(s), ASCII character(s), a pointer, an IP address, a MAC address, a memory address, other unique identifier, or a combination thereof.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "set" refers to a collection of one or more items.

The term "plurality" refers to two or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architecture

Methods, apparatuses, systems, and computer program products of the present disclosure may be embodied by any of a variety of computing devices. For example, the method, apparatus, system, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 1, an example computing system 100 within which some embodiments of the present disclosure operate is illustrated. In particular, FIG. 1 illustrates an example collaborative contextual summary interface management system 200 configured to communicate with an audio-video conferencing interface service and/or two or more client devices 101A-101N in accordance with some example embodiments described herein. Users may access a collaborative contextual summary interface management system 200 via a communications network 102 using one or more of client devices 101A-101N. Collaborative contextual summary interface management system 200 may comprise a collaborative contextual summary interface server 210 in communication with at least one repository, such as collaborative contextual summary interface data repository 215. Such repository(ies) may be hosted by the collaborative contextual summary interface server 210 or otherwise hosted by devices in communication with the collaborative contextual summary interface server 210. The collaborative contextual summary interface management system 200 is, in some embodiments, able to generate a collaborative contextual summary interface in association with an audio-video conferencing interface service, as will be described below.

Collaborative contextual summary interface server 210 may include circuitry, networked processors, or the like configured to perform some or all of the collaborative contextual summary interface server-based processes described herein (e.g., generate and/or transmit commands and instructions for rendering a collaborative contextual summary interface to client devices 101A-101N, using data from, for example, collaborative contextual summary interface data repository 215), and may be any suitable network server and/or other type of processing device. In this regard, the collaborative contextual summary interface server 210 may be embodied by any of a variety of devices, for example, the collaborative contextual summary interface server 210 may be embodied as a computer or a plurality of computers. For example, collaborative contextual summary interface server 210 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, collaborative contextual summary interface server 210 may be located remotely from the collaborative contextual summary interface data repository 215, although in other embodiments, the collaborative contextual summary interface server 210 may comprise the collaborative contextual summary interface data repository 215. The collaborative contextual summary interface server 210 may, in some embodiments, comprise several servers or computing devices performing interconnected and/or distributed functions. Despite the many arrangements contemplated herein, collaborative contextual summary interface server 210 is shown and described herein as a single computing device to avoid unnecessarily overcomplicating the disclosure.

Collaborative contextual summary interface server 210 can communicate with one or more client devices 101A-101N and/or an audio-video conferencing interface service 105 via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the collaborative contextual summary interface management system 200.

Collaborative contextual summary interface data repository 215 may be stored by any suitable storage device configured to store some or all of the information described herein (e.g., memory 201 of the collaborative contextual summary interface server 210 or a separate memory system separate from the collaborative contextual summary interface server 210, such as one or more database systems, backend data servers, network databases, cloud storage devices, or the like provided by another device (e.g., online application or 3rd party provider), such as a Network Attached Storage (NAS) device or devices, or as a separate database server or servers). Collaborative contextual summary interface data repository 215 may comprise data received from the collaborative contextual summary interface server 210 (e.g., via a memory 201 and/or processor(s) 202) and/or a client device 101A-101N, and the corresponding storage device may thus store this data. Collaborative contextual summary interface data repository 215 includes information accessed and stored by the collaborative contextual summary interface server 210 to facilitate the operations of the collaborative contextual summary interface management system 200. As such, collaborative contextual summary interface data repository 215 may include, for example, without limitation, presentation identifier(s), user identifier(s), captured content identifier(s), capture type identifier(s), timestamp value(s), and/or the like.

The client devices 101A-101N may be implemented as any computing device as defined above. That is, the client devices 101A-101N may also include circuitry, networked processors, or the like configured to perform some or all of the apparatus-based processes described herein, and may include a suitable network server and/or other type of processing device (e.g., a controller or computing device of the client devices 101-101N). Electronic data received by the collaborative contextual summary interface server 210 from the client devices 101A-101N may be provided in various forms and via various methods. For example, the client devices 101A-101N may include desktop computers, laptop computers, smartphones, netbooks, tablet computers, wearables, and/or other networked device, that may be used for any suitable purpose in addition to presenting the collaborative contextual summary interface to a user and otherwise providing access to the collaborative contextual summary interface management system 200. The depictions in FIG. 1 of "N" client devices are merely for illustration purposes. According to some embodiments, the client devices 101A-101N may be configured to display an interface on a display of the client device for viewing, editing, and/or otherwise interacting with at least one collaborative contextual summary interface, which may be provided by the collaborative contextual summary interface management system 200.

In embodiments where a client device 101A-101N is a mobile device, such as a smartphone or tablet, the client device 101A-101N may execute an "app" to interact with the collaborative contextual summary interface management system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the collaborative contextual summary interface management system 200 via a web browser. As yet another example, the client devices 101A-101N may include various hardware or firmware designed to interface with the collaborative contextual summary interface management system 200. Example embodiments contemplated herein may have various form factors and designs but will nevertheless include at least the components illustrated in FIG. 3 and described in connection therewith.

Example Apparatuses for Implementing Embodiments of the Present Disclosure

FIG. 2 shows a schematic block diagram of example circuitry, some or all of which may be included in a collaborative contextual summary interface server 210. In accordance with some example embodiments, collaborative contextual summary interface server 210 may include various means, such as memory 201, processor 202, input/output circuitry 203, and/or communications circuitry 204. Moreover, in some embodiments, collaborative contextual summary interface circuitry 205 may also or instead be included in the collaborative contextual summary interface server 210. For example, where collaborative contextual summary interface circuitry 205 is included in collaborative contextual summary interface server 210, collaborative contextual summary interface circuitry 205 may be configured to facilitate the functionality discussed herein regarding capturing content of one or more capture types and generating, causing storage of, updating, and/or retrieving collaborative contextual summary interface(s). An apparatus, such as collaborative contextual summary interface server 210, may be configured, using one or more of the circuitry 201, 202, 203, 204, and 205, to execute the operations described above with respect to FIG. 1 and below in connection with FIGS. 4-7.

Although the use of the term "circuitry" as used herein with respect to components 201-205 are described in some cases using functional language, it should be understood that the particular implementations necessarily include the use of particular hardware configured to perform the functions associated with the respective circuitry as described herein. It should also be understood that certain of these components 201-205 may include similar or common hardware. For example, two sets of circuitry may both leverage use of the same processor, network interface, storage medium, or the like to perform their associated functions, such that duplicate hardware is not required for each set of circuitry. It will be understood in this regard that some of the components described in connection with the collaborative contextual summary interface server 210 may be housed within this device, while other components are housed within another of these devices, or by yet another device not expressly illustrated in FIG. 1.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the collaborative contextual summary interface server 210 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, collaborative contextual summary interface server 210. The memory 201 is non-transitory and may include, for example, one or more volatile and/or non-volatile memories, or some combination thereof. In other words, for example, the memory 201 may be an electronic storage device (e.g., a non-transitory computer readable storage medium). The memory 201 may be configured to store information, data, content, applications, instructions, or the like, for enabling an apparatus, e.g., collaborative contextual summary interface server 210, to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling collaborative contextual summary interface server 210 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by collaborative contextual summary interface server 210 during the course of performing its functionalities.

Processor 202 may be embodied in a number of different ways and may, for example, include one or more processing devices configured to perform independently. Additionally, or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as collaborative contextual summary interface server 210. The plurality of processors may be in operative communication with each other and may be collectively configured to perform one or more functionalities of collaborative contextual summary interface server 210 as described herein.

In an example embodiment, processor 202 is configured to execute instructions stored in the memory 201 or otherwise accessible to processor 202. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause collaborative contextual summary interface server 210 to perform one or more of the functionalities of collaborative contextual summary interface server 210 as described herein.

In some embodiments, collaborative contextual summary interface server 210 further includes input/output circuitry 203 that may, in turn, be in communication with processor 202 to provide an audible, visual, mechanical, or other output and/or, in some embodiments, to receive an indication of an input from a user, a client device 101A-101N, audio-video conferencing interface service 105, or another source. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In some embodiments, aspects of input/output circuitry 203 may be reduced as compared to embodiments where collaborative contextual summary interface server 210 may be implemented as an end-user machine or other type of device designed for complex user interactions. In some embodiments (like other components discussed herein), input/output circuitry 203 may even be eliminated from collaborative contextual summary interface server 210. Input/output circuitry 203 may be in communication with memory 201, communications circuitry 204, and/or any other component(s), such as via a bus. Although more than one input/output circuitry and/or other component can be included in collaborative contextual summary interface server 210, only one is shown in FIG. 2 to avoid overcomplicating the disclosure (e.g., like the other components discussed herein).

Communications circuitry 204, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with collaborative contextual summary interface server 210. In this regard, communications circuitry 204 may include, for example, a network interface for enabling communications with a wired or wireless communication network. For example, in some embodiments, communications circuitry 204 is configured to receive and/or transmit any data that may be stored by memory 201 using any protocol that may be used for communications between computing devices. For example, communications circuitry 204 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 204 includes circuitry for interacting with the antenna(s) to cause transmission of signals via the antenna(e) or to handle receipt of signals received via the antenna(e). These signals may be transmitted by collaborative contextual summary interface server 210 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of collaborative contextual summary interface server 210, such as via a bus.

In some embodiments, collaborative contextual summary interface circuitry 205 may also or instead be included and configured to perform the functionality discussed herein related to capturing content of one or more capture types and generating, causing storage of, updating, and/or retrieving collaborative contextual summary interface(s). In some embodiments, collaborative contextual summary interface circuitry 205 includes hardware, software, firmware, and/or a combination of such components, configured to support various aspects of such collaborative contextual summary interface-related functionality, features, and/or services of the collaborative contextual summary interface server 210 as described herein (e.g., designed to generate a collaborative contextual summary interface based upon at least captured content data object(s)). It should be appreciated that in some embodiments, collaborative contextual summary interface circuitry 205 performs one or more of such exemplary actions in combination with another set of circuitry of the collaborative contextual summary interface server 210, such as one or more of memory 201, processor 202, input/output circuitry 203, and communications circuitry 204. For example, in some embodiments, collaborative contextual summary interface circuitry 205 utilizes processing circuitry, such as the processor 202 and/or the like, to perform one or more of its corresponding operations. In some instances, the collaborative contextual summary interface circuitry 205 may generates an initial interface that is subsequently modified by captured content data object(s) and/or the like. In a further example, in some embodiments, some or all of the functionality of collaborative contextual summary interface circuitry 205 may be performed by processor 202. In this regard, some or all of the example processes and algorithms discussed herein can be performed by at least one processor 202 and/or collaborative contextual summary interface circuitry 205. It should also be appreciated that, in some embodiments, collaborative contextual summary interface circuitry 205 may include a separate processor, specially configured field programmable gate array (FPGA), or application specific interface circuit (ASIC) to perform its corresponding functions.

Additionally or alternatively, in some embodiments, collaborative contextual summary interface circuitry 205 utilizes memory 201 to store collected information. For example, in some implementations, collaborative contextual summary interface circuitry 205 includes hardware, software, firmware, and/or a combination thereof, that interacts with collaborative contextual summary interface data repository 215 and/or memory 201 to send, retrieve, update, and/or store data values embodied by and/or associated with collaborative contextual summary interface data, capture content request(s), captured content data object(s), user identifier(s), presentation identifier(s), capture type identifier(s), timestamp value(s), captured content identifier(s), textual transcription data, collaborative contextual summary interface object(s) and associated data that is configured for association with, for example, generating and/or updating a collaborative contextual summary interface, and to support the operations of the collaborative contextual summary interface circuitry 205 and the remaining circuitry. Additionally or alternatively, in some embodiments, collaborative contextual summary interface circuitry 205 utilizes input/output circuitry 203 to facilitate user output (e.g., causing rendering of one or more user interface(s) such as a collaborative contextual summary interface), and/or to receive user input (e.g., user clicks, user taps, keyboard interactions, user gesture, and/or the like). Additionally or alternatively still, in some embodiments, the collaborative contextual summary interface circuitry 205 utilizes communications circuitry 204 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of collaborative contextual summary interface server 210 to implement various operations, including the examples shown herein. As such, a series of computer-readable program code portions may be embodied in one or more computer program products and can be used, with a device, collaborative contextual summary interface server 210, database, and/or other programmable apparatus, to produce the machine-implemented processes discussed herein. It is also noted that all or some of the information discussed herein can be based on data that is received, generated and/or maintained by one or more components of the collaborative contextual summary interface server 210. In some embodiments, one or more external systems (such as a remote cloud computing and/or data storage system) may also be leveraged to provide at least some of the functionality discussed herein.

Referring now to FIG. 3, the client devices (e.g., client device 101A-101N) or the like, may be embodied by one or more computing systems, such as apparatus 300 shown in FIG. 3. FIG. 3 is a schematic block diagram showing example circuitry, some or all of which may be included in an example apparatus 300, configured to enable a user to access the collaborative contextual summary interface management system 200 and/or the audio-video conferencing interface service 105 in accordance with certain embodiments of the present disclosure. For example, in some embodiments, the apparatus 300 embodies a client device 101A-101N and is configured to enable a user to interact with the audio-video conferencing interface service 105 to access an active audio-video conference presentation that is configured for display to participating client devices and/or the collaborative contextual summary interface management system 200 to capture and/or review selected content.

In accordance with some example embodiments, apparatus 300 may include various means, such as memory 301, processor 302, input/output circuitry 303, and/or communications circuitry 304. Apparatus 300, such as a client device 101A-101N, may be configured, using one or more of the circuitry 301, 302, 303, and 304, to execute the operations described above with respect to FIG. 1 and below in connection with FIGS. 4-7.

In some embodiments, apparatus 300 communicates with collaborative contextual summary interface management system 200 (for example, embodied by the collaborative contextual summary interface server 210 as depicted and described with respect to FIG. 2). It should be appreciated that, in some embodiments, a collaborative contextual summary interface management system 200 communicates with any number of apparatus(es) 300. It should be appreciated that the components 301-304 may be embodied similar to that of the similarly named components described with respect to FIG. 2. For purposes of brevity and length of disclosure, duplicate description of such functionality is omitted. Nevertheless, these device elements, operating together, provide the respective apparatuses with the functionality necessary to facilitate the communication of data (e.g., collaborative contextual summary interface data, capture content request(s), captured content data object(s), user identifier(s), presentation identifier(s), capture type identifier(s), timestamp value(s), captured content identifier(s), textual transcription data, collaborative contextual summary interface object(s) and/or the like) for capturing content and generating a collaborative contextual summary interface. That is, the apparatus 300, in some embodiments, is configured, using one or more sets of circuitry 301, 302, 303, and/or 304, to execute the operations described herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of collaborative contextual summary interface server 210 and client devices 101A-101N.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with a client device or an admin user interacting with an admin device). Information/data generated at the client device (e.g., as a result of the user interaction with an admin device) can be received from the client device (e.g., client device or admin device) at the server.

Example Operations for Generating and/or Updating a Collaborative Contextual Summary Interface In various embodiments of the present disclosure, an apparatus (e.g., collaborative contextual summary interface server 210) is configured to generate a collaborative contextual summary interface in association with an audio-video conferencing interface service. FIG. 4 illustrates an example collaborative contextual summary interface 400 in accordance with example embodiments of the present disclosure. It should be appreciated that the information depicted in the example collaborative contextual summary interface 400 is exemplary, and that similar and/or alternative data, parameters, data values, and/or the like may be provided. Additionally or alternatively, in some embodiments, the layout of the various interface elements, and/or sub-interfaces of the depicted collaborative contextual summary interface 400 may differ without deviating from scope of this disclosure. As such, the example depicted example collaborative contextual summary interface 400, sub-interfaces, elements, and data values depicted therein are provided for descriptive and illustrative purposes and are not to limit the scope or spirit of the disclosure herein.

FIG. 4 illustrates an exemplary collaborative contextual summary interface 400 structured in accordance with various embodiments of the present disclosure. In some embodiments, the collaborative contextual summary interface 400 is configured for rendering to at least the one of the participating client devices 101A-101N. Additionally, or alternatively, in some embodiments, the collaborative contextual summary interface 400 is configured for rendering to at least the one of the non-participating client devices 101A-101N. As illustrated, the collaborative contextual summary interface 400 comprises one or more captured content interface indicators 410. Additionally, or alternatively, in some embodiments, the collaborative contextual summary interface 400 comprises one or more of a visual playback representation element 420, a playback interface 430, a transcription interface 440 comprising textual transcription data, one or more annotation bubble objects 470, a share summary interface element 450, and an export captured content interface element 460. Additionally, or alternatively, in some embodiments, the collaborative contextual summary interface 400 comprises one or more of a meeting information interface component (e.g., to display meeting information such as purpose, attendees, date, time, and/or the like), an emphasis interface component (e.g., to display one or more captured content items that have been highlighted, emphasized, or otherwise indicated as important, such as with a star indicator or icon), an object share interface component (e.g., a user interface component that overlays the transcription interface 440 and/or the playback interface 430 providing identification of objects being shared, such as a link to a Confluence® page or ticket), an object state change interface component (e.g., a user interface component that overlays the transcription interface 440 and/or the playback interface 430 indicating state change of an object being shared, such as a Jira® ticket being resolved while it is being shared), a chat object share interface component (e.g., a user interface component that overlays the transcription interface 440 and/or the playback interface 430 providing identification of objects being shared in a chat room of the monitored active audio-video conferencing interface service, such as a link to a Confluence® page or ticket identified in the associated chat room), a share interface component (e.g., including an actuator configured for user engagement for initiating requests to share one or more interfaces or interface components with one or more other users), a breadcrumb interface component (e.g., a user interface component revealing a user's location), and/or the like.

The method, apparatus (e.g., collaborative contextual summary interface server 210), and computer program product of an example embodiment will now be described in conjunction with the operations illustrated in FIGS. 5A-7. With reference to FIG. 5A, a flowchart is provided broadly illustrating a series of operations or process blocks for collaborative contextual summary interface generation in association with an audio-video conferencing interface service, in accordance with some example embodiments of the present disclosure. The operations illustrated in FIG. 5A may, for example, be performed by, with the assistance of, and/or under the control of one or more apparatuses, such as collaborative contextual summary interface server 210, as described above. In this regard, performance of the operations may invoke one or more of memory 201, processor 202, input/output circuitry 203, communications circuitry 204, and/or collaborative contextual summary interface circuitry 205. Certain operations may be considered optional, as indicated by the dashed lines.

As shown in operation 505, the apparatus (e.g., collaborative contextual summary interface server 210) includes means, such as processor 202, input/output circuitry 203, communications circuitry 204, and/or the like, for monitoring an active audio-video conference presentation that is configured for display to participating client devices by an audio-video conferencing interface service. By way of example, prior to or during an active audio-video conference presentation, a user provides the collaborative contextual summary interface server 210 with access to the active audio-video conference presentation. For example, in some embodiments, the user provides the collaborative contextual summary interface server 210 with access by simply providing login credentials and data of the audio-video conferencing interface services to the collaborative contextual summary interface server 210. In some embodiments, the audio-video conferencing interface services communicates with the collaborative contextual summary interface server 210, and vice versa, through one or more application program interfaces (APIs). In some embodiments, the user provides login credentials to the audio-video conferencing interface service, which in turn, provides the collaborative contextual summary interface server 210 with an access code, which can be exchanged for one or more access tokens or other authentication credentials, which are then used by the collaborative contextual summary interface server 210 to access data associated with the active audio-video conference presentation.

In some embodiments, the active audio-video conference presentation is a live streaming presentation displayed in real time by the audio-video conferencing interface service to each of the participating client devices. By way of non-limiting example, Allyson, Bethany and Cheri are users accessing and participating in a live virtual meeting as it is displayed in real time. Client devices 101A-101N associated with the user identifiers corresponding to Allyson, Bethany and Cheri are known as participating client devices. In still other embodiments, the active audio-video conference presentation is a stored playback presentation that is configured to be displayed to participating client devices and/or non-participating client devices. By way of non-limiting example, after completion of the live streaming presentation, Allyson can use her participating client device to access a stored playback presentation of the active audio-video conference presentation. In a further non-limiting example, Debbie, who did not participate in the live virtual meeting, can use her non-participating client device to access the stored playback presentation.

As shown by operation 510, the apparatus (e.g., collaborative contextual summary interface server 210) includes means, such as processor 202, input/output circuitry 203, communications circuitry 204, collaborative contextual summary interface circuitry 205 and/or the like, for identifying a first capture content request associated with the active audio-video conference presentation. In some embodiments, the first capture content request is received from a client device 101A-101N. By way of example, in association with an active audio-video conference presentation, a first user interacts with a client device 101A-101N that is in network communication with the collaborative contextual summary interface server 210 to indicate an intent to capture selected content of the monitored active audio-video conference presentation. As such, in some embodiments, this attempt to capture content by the first user generates and transmits a first capture content request from the client device 101A-101N to the collaborative contextual summary interface server 210. The first capture content request from the client device 101A-101N includes, in some embodiments, various metadata relating to the request by the first user via the client device 101A-101N. Said differently, in some embodiments, the first capture content request identified at operation 510 comprises a first user identifier associated with one of the participating client devices, a first capture type identifier, the presentation identifier corresponding to the active audio-video conference presentation, and/or an initial timestamp value associated with the first capture content request.

In some embodiments, the user is presented with a capture content interface component (not shown), the capture content interface component configured to display one or more selectable options corresponding to the type of capture that the user may desire to perform with respect to the active audio-video conference presentation. By way of non-limiting example, during the active audio-video conference presentation, the collaborative contextual summary interface server 210 generates, transmits, and causes rendering of a capture content interface component to the client device, the capture content interface component comprising the capture type options available with respect to the corresponding active audio-video conference presentation. In such example, Allyson is presented with such available capture type options, such as a capture note type, an assign action type, a capture decision type, a record moment type, an external service push type, capture screenshot type, object state change type, capture question type, capture answer type, capture object link type, capture sprint start, and/or the like. In response to an important decision being discussed among the participants in the active audio-video conference presentation, Allyson engages with her participating client device 101A-101N to select the option corresponding to the capture decision type. The client device generates (e.g., via an application operating on the client device) a capture content request comprising the presentation identifier of the active audio-video conference presentation, the capture decision type identifier, Allyson's user identifier, and an initial timestamp value (e.g., identifying when—such as according to UTC global standard—the capture of media content begins). As such, depending on the capture type selection by the user, the capture content request comprises a corresponding capture type identifier.

In some embodiments, depending on the selected capture type, a concluding timestamp value is also included in the capture content request. For example, in some embodiments, the client device 101A-101N and/or the collaborative contextual summary interface server 210 is configured to request identification of and/or determine a concluding timestamp value, the concluding timestamp value identifying when the capture of media content ends relative to the start of a selected active audio-video conference presentation. For example, in some embodiments, a concluding timestamp value is associated with completion of a user interaction, such as no more keystrokes or receipt of the "enter" request. Subsequent interactions with the capture content will update the concluding timestamp value so as to encompass all interactivity with the capture content request. Thereafter, the capture content request with associated metadata is transmitted to the collaborative contextual summary interface server 210 where it is identified as a capture content request associated with the active audio-video conference presentation.

Additionally or alternatively, in still further embodiments, the first capture content request is received from the apparatus (e.g., collaborative contextual summary interface server 210) itself. For example, in some embodiments, the collaborative contextual summary interface server 210 is configured to automatically detect that an object (e.g., a slide, a Jira® ticket, a Confluence® page, and/or the like) is shared during the active audio-video conference presentation, correlate the detection with the object source (e.g., specific file), and programmatically capture a link to the associated object source to include in the collaborative contextual summary without requiring user interaction to initiate the capture.

Thereafter, as shown by operation 515, the apparatus (e.g., collaborative contextual summary interface server 210) includes means, such as processor 202, input/output circuitry 203, communications circuitry 204, collaborative contextual summary interface circuitry 205 and/or the like, for generating a first captured content data object based at least in part on the first capture content request. In some embodiments, the first captured content data object comprises one or more of the metadata associated with the first capture content request so as to correspond to the captured content. In some embodiments, the apparatus assigns the first captured content data object a first captured content identifier.

As shown by operation 520, the apparatus (e.g., collaborative contextual summary interface server 210) includes means, such as processor 202, input/output circuitry 203, communications circuitry 204, collaborative contextual summary interface circuitry 205 and/or the like, for correlating a first captured content interface indicator 410 to the first captured content data object. A captured content interface indicator 410 is a renderable indicator that can be displayed to a collaborative contextual summary interface 400, wherein the captured content interface indicator 410 corresponds with the captured content identified by the capture content request. In some embodiments, the first captured content interface indicator 410 corresponds to the capture type identifier. Continuing with the non-limiting example of Allyson's request discussed above, the first captured content interface indicator associated with the captured content of Allyson's request corresponds to the capture decision type identifier. In some embodiments, a captured content interface indicator is selected from a plurality of captured content interface indicators 410, each captured content interface indicator 410 associated with a different capture type (e.g., capture type identifier). That is, in some embodiments, captured content interface indicators 410 are visually different based at least in part on selected capture type associated with the corresponding capture content request. For example, a captured content interface indicator 410 associated with an assign action type capture content request may include a colored icon with a checkmark.

As shown by operation 525, the apparatus (e.g., collaborative contextual summary interface server 210) includes means, such as processor 202, input/output circuitry 203, communications circuitry 204, collaborative contextual summary interface circuitry 205 and/or the like, for optionally determining a position of the first captured content interface indicator 410. In some embodiments, the collaborative contextual summary interface 400 optionally comprises a visual playback representation element 420. Accordingly, in some embodiments, the apparatus determines such position relative to the visual playback representation element 420. A visual playback representation element 420 is a renderable component configured to visually depict a time duration of an active audio-video conference presentation. A non-limiting example of a visual playback representation element 420 is a video timeline or scroll bar as depicted in FIG. 4. In certain embodiments, one or more captured content interface indicators 410 are rendered to the visual playback representation element 420. In still further embodiments, a captured content interface indicator 410 is rendered to a position or location of the collaborative contextual summary interface 400 such that it is indicative of the initial timestamp value relative to a time duration of active-video conference presentation. For example, in some embodiments, the visual playback representation element 420 is a video timeline or scroll bar annotated with one or more captured content interface indicators 410 such that the captured content is visually indicated in comparison to a time duration of the active audio-video conference presentation. In some embodiments, the collaborative contextual summary interface server 210 determines such position(s) based at least in part on the initial timestamp value(s). For example, if the initial timestamp value of the first capture content request, although captured in a global time standard such as UTC, corresponds to 5 minutes and 30 seconds of elapsed time relative to the start of the selected active audio-video conference presentation and the entirety of the active audio-video conference presentation is 25 minutes, the collaborative contextual summary interface server 210 determines that the position of the corresponding captured content interface indicator 410 is approximately at ⅕ of the length of the visual playback representation element 420 (e.g., video timeline or scroll bar).

Additionally or alternatively, the collaborative contextual summary interface 400 optionally includes a transcription interface 440 comprising textual transcription data substantially synchronized with the active audio-video conference presentation. Accordingly, in some embodiments, the apparatus determines such position of the first captured content interface indicator 410 in relation to the textual transcription data. For example, in some embodiments, the textual transcription data is the data output resulting from one or more transcription operations performed with respect to one or more audio inputs of an audio visual conference presentation. As with the visual playback representation element 420, in some embodiments, the collaborative contextual summary interface server 210 determines the position of the captured content interface indicator 410 based at least in part on the initial timestamp value(s). For example, if the initial timestamp value of the first capture content request, although captured in a global time standard such as UTC, corresponds to 5 minutes and 30 seconds of elapsed time relative to the start of the selected active audio-video conference presentation, the collaborative contextual summary interface server 210 determines that the position of the corresponding captured content interface indicator 410 in the transcription interface 440 portion of the collaborative contextual summary interface 400 corresponds to that timestamp value in the textual transcription data as substantially synchronized with the active audio-video conference presentation. In certain embodiments, the transcription interface 440 comprises one or more annotation bubble objects 470 associated with the textual transcription data and at least one of the one or more annotation bubble objects 470 comprises the first captured content interface indicator 410 as such determined position.

As shown by operation 530, the apparatus (e.g., collaborative contextual summary interface server 210) includes means, such as processor 202, collaborative contextual summary interface circuitry 205, and/or the like, for generating a collaborative contextual summary interface 400 based at least in part on the first captured content data object. In some embodiments, the collaborative contextual summary interface 400 is configured for rendering to at least the one of the participating client devices 101A-101N associated with the first user identifier. In still further embodiments, the collaborative contextual summary interface 400 comprises the first captured content interface indicator 410.

Additionally or alternatively, as shown by operation 535, the apparatus (e.g., collaborative contextual summary interface server 210) includes means, such as processor 202, input/output circuitry 203, communications circuitry 204, collaborative contextual summary interface circuitry 205 and/or the like, for optionally storing the collaborative contextual summary interface 400 in a collaboration repository (e.g., collaborative contextual summary interface data repository 215) in association with the presentation identifier.

Thereafter, as shown by operation 540, the apparatus (e.g., collaborative contextual summary interface server 210) includes means, such as processor 202, input/output circuitry 203, communications circuitry 204, collaborative contextual summary interface circuitry 205 and/or the like, for optionally causing rendering of the collaborative contextual summary interface 400 to a client device (e.g., a participating client device associated with the first user identifier). For example, in some embodiments, the collaborative contextual summary interface circuitry 205 transmits an instruction to the client device 101A-101N to render the collaborative contextual summary interface 400 for viewing by at least the requesting user (e.g., Allyson). Additionally, in still further embodiments, the collaborative contextual summary interface circuitry 205 transmits instructions to one or more client devices 101A-101N other than the first user (e.g., other participating client devices and/or non-participating client devices) to render the collaborative contextual summary interface 400 for viewing by one or more users other than the requesting user, such that the collaborative contextual summary interface 400 comprising the first captured content interface indicator 410 is then shared among the other client devices 101A-101N via the collaborative contextual summary interface server 210. For example, the collaborative contextual summary interface 400 is rendered to client devices 101A-101N during a live streaming presentation (e.g., participating client devices) and/or a stored playback presentation (e.g., participating and/or non-participating client devices) of the active audio-video conference presentation such that collaborative contextual summary interface 400 is viewable by the first user (e.g., the requesting user, Allyson) and another user other than the first user (e.g., a second user such as Bethany).

In some embodiments, in causing rendering of the collaborative contextual summary interface 400 to a client device, the first captured content interface indicator 410 is displayed to the collaborative contextual summary interface 400 in the determined position (e.g., according to optional operation 525) relative to the visual playback representation element 420. As described hereafter with reference to FIG. 6, during viewing of an active audio-video conference presentation, in some embodiments, the collaborative contextual summary interface 400 is iteratively updated based upon one or more captured content data object(s) corresponding to captured content requests additionally identified by the apparatus (e.g., collaborative contextual summary interface server 210). For example, in some embodiments, the collaborative contextual summary interface 400 includes one or more captured content interface indicators 410 corresponding to a variety of identified capture content requests generated by one or more participating and/or non-participating client devices.

In some embodiments, the collaborative contextual summary interface 400 optionally comprises a share summary interface element 450. The share summary interface element 450 includes an actuator configured for user engagement for initiating requests to share the collaborative contextual summary interface 400 with one or more other users. Accordingly, additionally or alternatively, in certain embodiments, the apparatus (e.g., collaborative contextual summary interface server 210) includes means, such as processor 202, input/output circuitry 203, communications circuitry 204, collaborative contextual summary interface circuitry 205, and/or the like, for, upon detection of user engagement with the share summary interface element 450, optionally generating a collaborative contextual summary interface object that is configured to cause a client device 101A-101N to render the collaborative contextual summary interface 400. By way of non-limiting example, upon detection of user engagement with the share summary interface element 450, the collaborative contextual summary interface server 210 generates an MP4, URL, or similar data object corresponding to the captured content of the collaborative contextual summary interface 400 and outputs the data object (e.g., MP4) to a client device 101A-101N other than the participating client device of the requesting user. For example, user engagement with the share summary interface element 450 may trigger a request for identification of one or more intended recipients (e.g., participating and/or non-participating) of the collaborative contextual summary interface 400.

Thereafter, in some embodiments, the apparatus (e.g., collaborative contextual summary interface server 210) includes means, such as processor 202, input/output circuitry 203, communications circuitry 204, collaborative contextual summary interface circuitry 205, and/or the like, for, upon detection of user engagement with the share summary interface element 450, optionally outputting the collaborative contextual summary interface object (e.g., MP4) to one or more client devices 101A-101N. In some embodiments, the apparatus (e.g., collaborative contextual summary interface server 210) includes means, such as processor 202, input/output circuitry 203, communications circuitry 204, collaborative contextual summary interface circuitry 205, and/or the like, for, upon detection of user engagement with the collaborative contextual summary interface object, optionally causing rendering of the collaborative contextual summary interface 400 to the corresponding client devices. In some embodiments, one or more intended recipients are associated with participating client devices. Additionally or alternatively, one or more intended recipients are associated with non-participating client devices.

Additionally or alternatively, in still further embodiments, the collaborative contextual summary interface 400 optionally comprises an export captured content interface element 460. In some embodiments, for example, an export captured content interface element 460 includes one or more actuators configured for user engagement for initiating requests to export collaborative contextual summary interface data (e.g., data associated with an capture content identifier and/or data object) to one or more other internal or external services.

FIG. 5B is a signal diagram of an example data flow represented by the operations depicted in FIG. 5A. That is, FIG. 5B illustrates an example signal diagram illustrating data flow interactions between a collaborative contextual summary interface server, a client device, and a repository, when generating a collaborative contextual summary interface in accordance with one embodiment. FIG. 5B is described as being performed by a collaborative contextual summary interface server 210, a collaborative contextual summary interface data repository 215, and a client device 101A. These may be similar to those previously discussed with regards to FIG. 1.

Turning now to FIG. 6, a flowchart broadly illustrates another series of operations or process blocks for updating a collaborative contextual summary interface, in accordance with some example embodiments of the present disclosure. The example operations of FIG. 6 are illustrated from the perspective of a collaborative contextual summary interface management system 200. The operations illustrated in FIG. 6 may, for example, be performed by, with the assistance of, and/or under the control of one or more apparatuses, such as collaborative contextual summary interface server 210, as described above. In this regard, performance of the operations may invoke one or more of memory 201, processor 202, input/output circuitry 203, communications circuitry 204, and/or collaborative contextual summary interface circuitry 205.

In the embodiment illustrated in FIG. 6, as shown in operation 605, the apparatus (e.g., collaborative contextual summary interface server 210) includes means, such as input/output circuitry 203, communications circuitry 204, collaborative contextual summary interface circuitry 205 and/or the like, for identifying a second capture content request associated with the active audio-video conference presentation. In some embodiments, the second capture content request is received from a client device 101A-101N associated with the first user identifier. By way of example, in association with the active audio-video conference presentation as discussed with respect to FIG. 5A, the first user again interacts with a client device 101A-101N that is in network communication with the collaborative contextual summary interface server 210 to indicate an intent to capture additionally selected content of the monitored active audio-video conference presentation. Similar to the discussion of operation 510, in some embodiments, this attempt to capture additional content by the first user generates and transmits a second capture content request from the client device 101A-101N to the collaborative contextual summary interface server 210. The second capture content request from the client device 101A-101N includes, in some embodiments, a second capture type identifier, the presentation identifier corresponding to the active audio-video conference presentation, and/or an initial timestamp value associated with the second capture content request.

In an alternative embodiment, the second capture content request is received from a client device 101A-101N associated with a second user. By way of example, in association with the active audio-video conference presentation as discussed with respect to FIG. 5A, a second user interacts with a client device 101A-101N that is in network communication with the collaborative contextual summary interface server 210 to indicate an intent to capture selected content of the monitored active audio-video conference presentation. Similar to the discussion of operation 510, in some embodiments, this attempt to capture content by the second user generates and transmits a second capture content request from the client device 101A-101N to the collaborative contextual summary interface server 210. The second capture content request from the client device 101A-101N includes, in some embodiments, a second user identifier associated with second user, a second capture type identifier, the presentation identifier corresponding to the active audio-video conference presentation, and/or an initial timestamp value associated with the second capture content request.

Thereafter, as shown by operation 610, the apparatus (e.g., collaborative contextual summary interface server 210) includes means, such as processor 202, input/output circuitry 203, communications circuitry 204, collaborative contextual summary interface circuitry 205 and/or the like, for generating a second captured content data object based at least in part on the second capture content request. In some embodiments, the second captured content data object comprises one or more of the metadata associated with the second capture content request so as to correspond to the captured content. In some embodiments, the apparatus assigns the second captured content data object a second captured content identifier 410.

As shown by operation 615, the apparatus (e.g., collaborative contextual summary interface server 210) includes means, such as processor 202, input/output circuitry 203, communications circuitry 204, collaborative contextual summary interface circuitry 205 and/or the like, for correlating a second captured content interface indicator 410 to the second captured content data object, wherein the captured content interface indicator 410 corresponds with the captured content identified by the capture content request. In some embodiments, the second captured content interface indicator 410 corresponds to the second capture type identifier.

As shown by operation 620, the apparatus (e.g., collaborative contextual summary interface server 210) includes means, such as processor 202, collaborative contextual summary interface circuitry 205 and/or the like, for updating the collaborative contextual summary interface (e.g., as previously generated in operation 530 of FIG. 5A) based at least in part on the second captured content data object such that the collaborative contextual summary interface 400 comprises the first captured content interface indicator 410 and the second captured content interface indicator 410. In the exemplary instance where the second capture content request is generated by the same user as the first capture content request (e.g., first user), the collaborative contextual summary interface 400 is configured for rendering to at least the one of the participating client devices associated with the first user identifier. In the exemplary instance where the second capture content request is generated by the second user, the collaborative contextual summary interface 400 is configured for rendering to at least the one of the participating client devices associated with the first user identifier and at least the one of the participating client devices associated with the second user identifier.

Additionally, or alternatively, in some embodiments wherein the active audio-video conference presentation is a live streaming presentation displayed in real time by the audio-video conferencing interface service to each of the participating client devices, updating the collaborative contextual summary interface 400 based at least in part on the second captured content data object comprises iteratively updating the collaborative contextual summary interface 400 in real time. Similarly, in some embodiments wherein the active audio-video conference presentation is a stored playback presentation, iteratively updating the collaborative contextual summary interface 400 based at least in part on the second captured content data object comprises updating the collaborative contextual summary interface 400 in real time.

Turning now to FIG. 7, a flowchart broadly illustrates another series of operations or process blocks for updating a collaborative contextual summary interface, in accordance with some example embodiments of the present disclosure. The example operations of FIG. 7 are illustrated from the perspective of a collaborative contextual summary interface management system 200. The operations illustrated in FIG. 7 may, for example, be performed by, with the assistance of, and/or under the control of one or more apparatuses, such as collaborative contextual summary interface server 210, as described above. In this regard, performance of the operations may invoke one or more of memory 201, processor 202, input/output circuitry 203, communications circuitry 204, and/or collaborative contextual summary interface circuitry 205.

In the embodiment illustrated in FIG. 7, as shown in operation 705, the apparatus (e.g., collaborative contextual summary interface server 210) includes means, such as input/output circuitry 203, communications circuitry 204, collaborative contextual summary interface circuitry 205 and/or the like, for detecting user engagement with the first captured content interface indicator 410. For example, in some embodiments, the client device 101A-101N is configured to generate an engagement event in response to user engagement with the first captured content interface indicator 410 and thereafter transmit such engagement event to the collaborative contextual summary interface server 210.

As shown in operation 710, the apparatus (e.g., collaborative contextual summary interface server 210) includes means, such as input/output circuitry 203, communications circuitry 204, collaborative contextual summary interface circuitry 205 and/or the like, for updating the collaborative contextual summary interface 400 to display a stored playback presentation of at least a portion of the active audio-video conference presentation, wherein the stored playback presentation commences with rendering of media content of the active audio-video conference presentation corresponding to the initial timestamp value associated with the first captured content interface indicator 410. As discussed herein, the first captured content interface indicator 410 can be rendered to one or more of a visual playback representation element 420 and an annotation bubble object 470. In some embodiments, for example, in certain instances wherein the first captured content interface indicator 410 is associated with a visual playback representation element 420 and/or an annotation bubble object 470 (e.g., in the transcription interface 440), the collaborative contextual summary interface server 210 causes the stored playback presentation to continue presenting until complete and/or stopped by the user. Additionally or alternatively, in some embodiments, for example, certain instances wherein the user engages a first captured content interface indicator 410 associated with an annotation bubble object 470, the collaborative contextual summary interface server 210 concludes with rendering of media content of the active audio-video conference presentation corresponding to a concluding timestamp value.

FIGS. 5A, 5B, 6, and 7 thus illustrate flowcharts and signal diagrams describing the operation of apparatuses, methods, systems, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 201 of the collaborative contextual summary interface server 210 and executed by a processor 202 of the collaborative contextual summary interface server 210. As will be appreciated, any such computer program instructions may be loaded onto a computer or other programmable apparatus (e.g., hardware) to produce a machine, such that the resulting computer or other programmable apparatus implements various functions, including those functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to generate a collaborative contextual summary interface in association with an audio-video conferencing interface service, the apparatus comprising at least one processor and at least one memory, the at least one memory having computer-coded instructions therein, wherein the computer-coded instructions are configured to, in execution with the at least one processor, cause the apparatus to:

- monitor an active audio-video conference presentation that is configured for display to participating client devices by the audio-video conferencing interface service, wherein the active audio-video conference presentation is assigned a presentation identifier;
- identify a first capture content request associated with the active audio-video conference presentation, wherein the first capture content request comprises a first user identifier associated with one of the participating client devices, a first capture type identifier, and an initial timestamp value associated with the first capture content request;
- generate a first captured content data object based at least in part on the first capture content request, wherein the first captured content data object is assigned a first captured content identifier;
- correlate a first captured content interface indicator to the first captured content data object, wherein the first captured content interface indicator corresponds to the first capture type identifier; and
- generate a collaborative contextual summary interface based at least in part on the first captured content data object, wherein the collaborative contextual summary interface comprises the first captured content interface indicator, and wherein the collaborative contextual summary interface is configured for rendering to at least the one of the participating client devices associated with the first user identifier.

2. The apparatus of claim 1, wherein the active audio-video conference presentation is a live streaming presentation displayed in real time by the audio-video conferencing interface service to each of the participating client devices.

3. The apparatus of claim 1, wherein the active audio-video conference presentation is a stored playback presentation displayed to at least the one of the participating client devices associated with the first user identifier.

4. The apparatus of claim 1, wherein the first captured content interface indicator is selected from a plurality of captured content interface indicators, each captured content interface indicator associated with a different capture type identifier.

5. The apparatus of claim 4, wherein the first capture type identifier is selected from one of capture note type identifier, assign action type identifier, capture decision type identifier, record moment type identifier, external service push type identifier, capture screenshot type identifier, object state change type identifier, capture question type identifier, capture answer type identifier, capture object link type identifier, or capture sprint start type identifier.

6. The apparatus of claim 1, wherein the collaborative contextual summary interface comprises a visual playback representation element, the visual playback representation element representing a time duration of the active audio-video conference presentation.

7. The apparatus of claim 6, wherein the computer-coded instructions are further configured to, in execution with the at least one processor, cause the apparatus to:

- determine a position of the first captured content interface indicator relative to the visual playback representation element, wherein the determined position is based at least in part on the initial timestamp value relative to the time duration of active audio-video conference presentation; and
- cause rendering of the collaborative contextual summary interface to at least the one of the participating client devices associated with the first user identifier, wherein the first captured content interface indicator is displayed to the collaborative contextual summary interface in the determined position relative to the visual playback representation element.

8. The apparatus of claim 7, wherein upon detection of user engagement with the first captured content interface indicator, the computer-coded instructions are further configured to, in execution with the at least one processor, cause the apparatus to:

- update the collaborative contextual summary interface to display a stored playback presentation of at least a portion of the active audio-video conference presentation, wherein the stored playback presentation commences with rendering of media content of the active audio-video conference presentation corresponding to the initial timestamp value associated with the first captured content interface indicator.

9. The apparatus of claim 1, wherein the collaborative contextual summary interface further comprises a transcription interface, the transcription interface comprising textual transcription data substantially synchronized with the active audio-video conference presentation.

10. The apparatus of claim 9, wherein the transcription interface comprises one or more annotation bubble objects associated with the textual transcription data and wherein one of the one or more annotation bubble objects comprises the first captured content interface indicator.

11. The apparatus of claim 10, wherein upon detection of user engagement with the first captured content interface indicator, the computer-coded instructions are further configured to, in execution with the at least one processor, cause the apparatus to:

- update the collaborative contextual summary interface to display a stored playback presentation of at least a portion of the active audio-video conference presentation, wherein the stored playback presentation commences with rendering of media content of the active audio-video conference presentation corresponding to the initial timestamp value associated with the first captured content interface indicator.

12. The apparatus of claim 11, wherein the first capture content request further comprises a concluding timestamp value and the stored playback presentation concludes with rendering of media content of the active audio-video conference presentation corresponding to the concluding timestamp value.

13. The apparatus of claim 12, wherein the first capture type identifier is a record moment type identifier.

14. The apparatus of claim 1, wherein the computer-coded instructions are further configured to, in execution with the at least one processor, cause the apparatus to:

- store the collaborative contextual summary interface in a collaboration repository in association with the presentation identifier.

15. The apparatus of claim 14, wherein the collaborative contextual summary interface further comprises a share summary interface element.

16. The apparatus of claim 15, wherein upon detection of user engagement with the share summary interface element, the computer-coded instructions are configured to, in execution with the at least one processor, cause the apparatus to:

- generate a collaborative contextual summary interface object that is configured to cause a client device to render the collaborative contextual summary interface.

17. The apparatus of claim 16, wherein the computer-coded instructions are configured to, in execution with the at least one processor, cause the apparatus to:
- output the collaborative contextual summary interface object to at least one of the participating client devices, wherein the at least one of the participating client devices is not associated with the first user identifier; and
- upon detection of user engagement with the collaborative contextual summary interface object, cause rendering of the collaborative contextual summary interface to the at least one of the participating client devices.

18. The apparatus of claim 16, wherein the computer-coded instructions are configured to, in execution with the at least one processor, cause the apparatus to:
- output the collaborative contextual summary interface object to at least one non-participating client device; and
- upon detection of user engagement with the collaborative contextual summary interface object, cause rendering of the collaborative contextual summary interface to the at least one non-participating client device.

19. The apparatus of claim 1, wherein the computer-coded instructions are further configured to, in execution with the at least one processor, cause the apparatus to:
- identify a second capture content request associated with the active audio-video conference presentation, wherein the second capture content request comprises the first user identifier, a second capture type identifier, the presentation identifier, and an initial timestamp value associated with the second capture content request;
- generate a second captured content data object based at least in part on the second capture content request, wherein the second captured content data object is assigned a second captured content identifier;
- correlate a second captured content interface indicator to the second captured content data object, wherein the second captured content interface indicator corresponds to the second capture type identifier; and
- update the collaborative contextual summary interface based at least in part on the second captured content data object, wherein the collaborative contextual summary interface comprises the first captured content interface indicator and the second captured content interface indicator.

20. The apparatus of claim 1, wherein the computer-coded instructions are further configured to, in execution with the at least one processor, cause the apparatus to:
- identify a second capture content request associated with the active audio-video conference presentation, wherein the second capture content request comprises a second user identifier associated with one of the participating client devices, a second capture type identifier, and an initial timestamp value associated with the second capture content request;
- generate a second captured content data object based at least in part on the second capture content request, wherein the second captured content data object is assigned a second captured content identifier;
- correlate a second captured content interface indicator to the second captured content data object, wherein the second captured content interface indicator corresponds to the second capture type identifier; and
- update the collaborative contextual summary interface based at least in part on the second captured content data object,
- wherein the collaborative contextual summary interface comprises the first captured content interface indicator and the second captured content interface indicator, and
- wherein the collaborative contextual summary interface is configured for rendering to at least the one of the participating client devices associated with the first user identifier and at least the one of the participating client devices associated with the second user identifier.

21. The apparatus of claim 20, wherein the active audio-video conference presentation is a live streaming presentation displayed in real time by the audio-video conferencing interface service to each of the participating client devices, and wherein updating the collaborative contextual summary interface based at least in part on the second captured content data object comprises updating the collaborative contextual summary interface in real time.

22. The apparatus of claim 20, wherein the active audio-video conference presentation is a stored playback presentation, and wherein updating the collaborative contextual summary interface based at least in part on the second captured content data object comprises updating the collaborative contextual summary interface in real time.

* * * * *